June 6, 1933.                L. O. THOMPSON                1,912,954
                      STEAM PRESSURE GAUGE PROTECTOR
                           Filed May 3, 1932
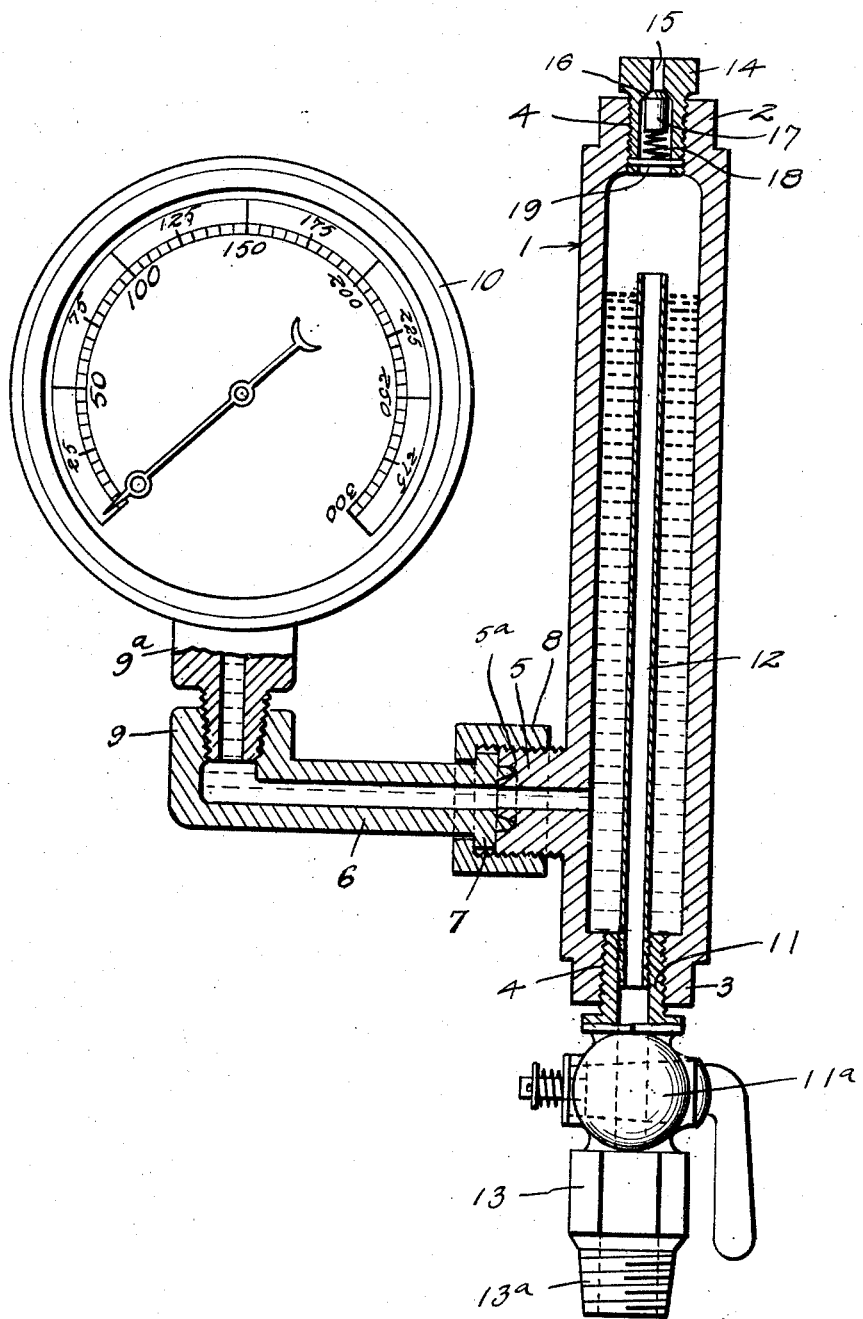
Inventor
L. O. Thompson
By Watson E. Coleman
Attorney Patented June 6, 1933

1,912,954

UNITED STATES PATENT OFFICE

LESTER O. THOMPSON, OF OKLAHOMA CITY, OKLAHOMA

STEAM PRESSURE GAUGE PROTECTOR

Application filed May 3, 1932. Serial No. 608,968.

This invention relates to improvements in means for protecting pressure gauges on steam boilers.

The primary object of the present invention is to provide an attachment which will protect the boiler pressure gauge by preventing live steam from coming into contact with the gauge spring and affecting the same in such a manner as to cause it to give inaccurate readings.

Another object of the invention is to provide a pressure gauge protector which will give protection to the gauge at periods when the same may be exposed to freezing temperatures, so as to prevent the parts thereof becoming frozen and incapable of correctly operating when pressure is applied thereto.

A still further object of the invention is to provide a pressure gauge protector which is of simple design and strong and durable construction, easy to install and so designed that it will not easily get out of order.

A most important object of this invention is to provide a protector of the character described which is separate from the gauge itself, but is so constructed that it may be readily attached to a standard gauge such as are used on practically all boilers and readily connected to the steam line.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

The figure represents the device embodying the present invention, in longitudinal section, showing a steam pressure gauge attached thereto.

Referring now more particularly to the drawing, wherein like numerals of reference indicate corresponding parts throughout the several views, the numeral 1 indicates generally the casing of the protector device embodying the present invention. As shown, this casing 1 is in the form of an elongated tubular body having the reduced or constricted upper and lower ends 2 and 3 respectively, each of which is interiorly threaded as indicated at 4. Adjacent the lower end of the casing 1 is a laterally directed exteriorly threaded nipple 5 which is integral with the casing and opens thereinto as shown. The outer end of this nipple has the annular groove 5ª formed therein, the inner wall of which groove is sloping so as to form a substantially cone-like body about the passage of the nipple.

Connected with the nipple 5 is a tubular extension 6 which has a collar 7 formed about one end for abutment against the forward end of the nipple and the end of the arm 6 adjacent this collar is formed as shown, to fit into the annular recess in the end of the nipple 5.

On the tubular arm 6 is a swivel coupling 8 which engages the nipple and draws the collar 7 tightly against the end thereof.

The opposite end of the arm 6 is turned upwardly as indicated at 9 and is interiorly threaded as shown, to receive the threaded nipple 9ª which forms a portion of a standard steam pressure gauge 10.

As shown, the tubular body 1 is of such a length that when the gauge 10 is mounted upon the arm 6 in the manner shown the top of the tube at the interior thereof will be in substantially the same plane as the top of the gauge body.

The threaded lower end 3 of the casing 1 has threaded therein the nipple portion 11 of a pet-cock which is indicated as a whole by the numeral 11ª. This pet-cock is of the character which has formed as a part thereof a hexagonal section 13 and a threaded lower portion 13ª to which a steam pipe (not shown) may be attached to connect the device to the boiler in association with which it is to be used. It will be seen from the figure that the handle of the pet cock extends parallel to the casing 1 when the pet cock is open to permit the passage of steam into the pressure gauge protector, this being the normal position of the handle under working conditions and the handle thus not projecting outward where it would be likely to be struck and shifted to close or diminish the passage through the pet cock.

The interior of the pet-cock nipple 11 is also threaded to receive a stand tube 12 which extends longitudinally through the casing 1 and terminates at a point adjacent the top of the casing, as illustrated.

In the upper end of the casing 1 there is removably mounted an air valve bushing 14. This bushing has the passage 15 therethrough enlarged at the inner end to form a valve seat 16, and within this enlarged inner portion of the passage 15 there is located a valve plug 17 which is normally maintained in contact with the seat 16 by a coil spring 18 which in turn is held in position by a pin member 19 which passes through the body of this bushing. It will, of course, be understood that any suitable means may be provided for maintaining the valve body 17 upon its seat or for maintaining the spring 18 in position, the elements here shown being preferred.

The necessity for this valve 17 is due to the fact that steam is continually condensing in the space above the level of the glycerine or water which fills the tubular casing 1, this space at the upper end of the tubular casing 1 constituting in effect a cooling chamber. When the condensed water accumulates on the top of the glycerine (if glycerine is used) to a degree where it will pass over the top of the tube 12, the water will run down this tube to the boiler and during this period, which occurs in an instant about every 45 seconds, the steam will be stopped. Under these circumstances, the pressure within the upper end of the chamber will become less than atmospheric and the valve will open for an instant until the pressure is equalized. This opening and closing movement of the valve is very quick and is just enough to keep a proper pressure in the upper portion of the tubular casing 1 and thus prevent variations in the glycerine column and in the gauge which would occur were this valve not provided. The plug 14 or air valve bushing permits the valve to be readily withdrawn whenever necessary either for replacement or cleaning but the most important feature of this plug 14 is that it permits the inspector's gauge to be attached to the tubular casing whenever the device has to be inspected by the boiler inspectors.

In operation the casing 1 is filled with glycerine to the height of the upper end of the tube 12. It will, of course, be understood that when the casing is filled the gauge arm 6 and the gauge 10 will be filled also. When the steam enters the casing 1 it will pass upwardly through the pipe or tube 12 to the upper end of the casing and exert pressure against the body of glycerine therein, through which the pressure will be transmitted to the gauge. The volume of glycerine in the casing 1 will, of course, be reduced slightly as some of it is forced over into the gauge and when the steam pressure drops the reduction in pressure within the upper portion of the casing will be compensated for by the introduction of air through the valve bushing 4 as previously stated. By the provision of the valve in the top of the casing 1 the collapse of the tubes or weakening of the other parts of the gauge 10 is prevented through the reduction of pressure in the gauge when the fire in the steam boiler to which the gauge is attached is turned off or drawn during the existence of a full head of steam.

From the foregoing description it will be readily seen that the pressure of steam within the boiler, to which the gauge and protector may be attached, will be indicated by the gauge without the steam coming into contact with the elements in the gauge and it will also be appreciated that, since glycerine can withstand extremely low temperatures without freezing, the elements of the gauge will be protected when the gauge is exposed to freezing temperatures.

While in the foregoing specification the gauge protector has been described as being filled with glycerine and it is preferred that it be used in this condition, it is, of course, to be understood that the invention is not to be limited to the use of the protector with glycerine as it may be allowed to fill with condenser water and the parts protected thereby from direct contact with the steam. It will, of course, be obvious that in extremely cold locations the use of glycerine is desirable because of its low freezing point and in addition glycerine will act as a lubricant for the gauge parts.

Having thus described the invention, what is claimed is:—

1. A protector for steam pressure gauges, comprising a casing designed to receive a fluid, means for connecting a pressure gauge with said casing whereby said fluid may flow into the gauge, said casing being only partially filled with the fluid, means for introducing steam into the casing above the fluid level, and an automatically opening valve in the upper part of said casing permitting air to enter thereinto above said fluid level when the pressure in the upper portion of the gauge is less than atmospheric.

2. A steam gauge protector, comprising an elongated tubular body designed to be vertically disposed and to be partially filled with a fluid having low freezing and non-corroding qualities, a tube extending longitudinally of said casing from the bottom to a point adjacent the top thereof, means for coupling a steam pipe with said tube for the introduction of steam into the upper part of the casing, a tubular arm having connection at one end with the lower part of said casing and adapted to have a pressure gauge connected at its other end, said arm and gauge receiving said fluid from the casing, a bushing having screw-threaded engagement with the upper end wall of the tubular body, the bushing having an air inlet aperture and a valve chamber inward of the aperture and a valve disposed in said chamber and yieldingly held against said aperture, the valve opening inwardly upon a reduction of pressure within the upper portion of the tubular body.

3. A protector for steam pressure gauges comprising a tubular metallic casing having an integral outstanding exteriorly screw-threaded nipple intermediate its ends whereby it may be connected to a standard steam gauge, the lower end of the casing having an interiorly threaded opening, a pet cock below the casing having a nipple threaded in said opening, the pet cock being connectible with a source of steam, a centrally disposed tube of relatively small diameter having steam-tight engagement with the nipple of the pet cock and extending upward centrally through the tubular casing nearly to the upper end thereof, the space between the central tube and the casing being filled with liquid, the upper end of the casing having a screw-threaded aperture, a hollow bushing disposed in said aperture and having an aperture through its end communicating with the exterior air, and a valve yieldingly held in position to close said aperture in the bushing but opening inwardly on a reduction in pressure in the upper portion of the tubular casing.

4. A protector for steam pressure gauges comprising a tubular metallic casing having an integral outwardly extending screw-threaded nipple intermediate its ends, a tubular extension engageable against the end of said nipple and having a shoulder, the outer end of the tubular extension being angled and interiorly screw-threaded for engagement with the nipple of a standard gauge, a collar engaging the screw-threads of the nipple and engaging said shoulder whereby to detachably hold the extension against said nipple, the lower end of the tubular casing having an interiorly screw-threaded opening, a pet cock having a nipple screw-threaded within said opening, the pet cock having a valve and a handle for the valve, a valve opening communication to the pet cock when the handle is turned into parallel relation to the axis of the casing, a tube of relatively small diameter having steam-tight engagement with the nipple of the pet cock and extending upwardly centrally from the tubular casing nearly to the upper end thereof, the space between the central tube and the casing being adapted to be filled with liquid, a bushing having screw-threaded engagement with the upper end of the tubular casing and an inwardly opening valve in said bushing yieldingly held to its seat but moving inward when the pressure within the upper end of the casing is reduced below a predetermined point.

5. The combination with a standard pressure gauge having a nipple of a protector adapted to be disposed between the pressure gauge and the steam line, the protector comprising a tubular metallic casing having interiorly screw-threaded openings at its upper and lower ends and having a nipple projecting outward from the side wall of the casing adjacent its lower end, the nipple being exteriorly screw-threaded, a tubular connecting element having screw-threaded engagement with the nipple of the gauge, means for detachably connecting said element with the nipple of the casing, a pet cock having screw-threaded engagement with the opening at the lower end of the casing, a tube of relatively small diameter having steam-tight engagement with the pet cock and extending upward through the casing nearly to its upper end, the central tube extending upward nearly to the upper end of the gauge, the space between the central tube and the outer casing being filled with liquid whereby the gauge will be filled with liquid, a removable bushing in the upper end of the casing, and means automatically admitting air into the space at the upper end of the casing above the liquid when pressure within the upper end of the casing is reduced below atmospheric.

In testimony whereof I hereunto affix my signature.

LESTER O. THOMPSON.